United States Patent
Xiang (10) Patent No.: US 10,976,566 B2
(45) Date of Patent: Apr. 13, 2021

(54) OPTICAL IMAGING EQUIPMENT AND METHOD

(71) Applicant: Nanjing Peixuan Yapu Optoelectronic Technology Co., Ltd., Nanjing (CN)

(72) Inventor: Hong Xiang, Beijing (CN)

(73) Assignee: Nanjing Peixuan Yapu Optoelectronic Technology Co., Ltd., Nanjing (CN)

( * ) Notice: Subject to any disclaimer, the term of this patent is extended or adjusted under 35 U.S.C. 154(b) by 0 days.

(21) Appl. No.: 16/729,066

(22) Filed: Dec. 27, 2019

(65) Prior Publication Data
US 2020/0209644 A1 Jul. 2, 2020

(30) Foreign Application Priority Data

Dec. 29, 2018 (CN) .......................... 2018 1 1633685

(51) Int. Cl.
*G02B 27/58* (2006.01)
*G01N 21/64* (2006.01)
(Continued)

(52) U.S. Cl.
CPC .............. *G02B 27/58* (2013.01); *G01N 21/64* (2013.01); *G02B 21/02* (2013.01); *G02B 21/06* (2013.01);
(Continued)

(58) Field of Classification Search
CPC ........ G02B 27/58; G02B 21/02; G02B 21/06; G02B 21/16; G02B 21/26; G02B 21/367; G01N 21/64
(Continued)

(56) References Cited

U.S. PATENT DOCUMENTS

| | | | |
|---|---|---|---|
| 2014/0333998 A1* | 11/2014 | Kohli | G02B 21/367 359/391 |
| 2015/0106979 A1* | 4/2015 | Difato | G01Q 60/24 850/33 |
| 2016/0301915 A1* | 10/2016 | Shechtman | G02B 21/008 |

OTHER PUBLICATIONS

Jia, B., et al., "Fabrication of a Probe-Lens Device for Scanning Super-Resolution Imaging Platform," Proceedings of the 12th IEEE International Conference on Nano/Micro Engineered and Molecular Systems, Los Angeles, Apr. 9-12, 2017, pp. 327-332.

(Continued)

*Primary Examiner* — Allen C Wong
(74) *Attorney, Agent, or Firm* — Davis Wright Tremaine LLP; Michael J. Donohue (57) ABSTRACT

An optical imaging equipment and method. The optical imaging equipment includes an optical microscope, an objective table, a light source module and an objective lens. The objective table is movable in the XY-plane, the light source module contains illumination light sources, and the objective lens is movable in the Z-axis direction; a three dimensions (3D) electric sample table is fixed on the objective table, which is used for carrying a sample to be tested and driving the sample to move in 3D directions relative to the objective table; a microsphere is fixed on a transparent substrate; the objective lens, the microsphere and the sample to be tested are arranged in the Z-axis direction in sequence, wherein, the transparent substrate along with the microsphere thereon can be moved to a first position and remain stationary relative to the objective table in the Z-axis direction, the 3D electric sample table can adjust the sample to be tested with respect to the microsphere to an imaging plane which is parallel to the XY-plane and a first image is formed by the microsphere, the objective lens can be adjusted to a second position so that the objective lens can perform a
(Continued)

secondary imaging of the first image to form a second image.

10 Claims, 6 Drawing Sheets

(51) Int. Cl.
    *G02B 21/02*     (2006.01)
    *G02B 21/06*     (2006.01)
    *G02B 21/16*     (2006.01)
    *G02B 21/26*     (2006.01)
    *G02B 21/36*     (2006.01)

(52) U.S. Cl.
    CPC ............ *G02B 21/16* (2013.01); *G02B 21/26* (2013.01); *G02B 21/367* (2013.01)

(58) Field of Classification Search
    USPC .......................................................... 348/79
    See application file for complete search history.

(56) References Cited

OTHER PUBLICATIONS

Krivitsky, L., et al., "Locomotion of Microspheres for Super-Resolution Imaging," Scientific Reports 3(3501):1-5, Dec. 2013.

Lai, H., et al., "Imaging of Nanoscale Particles in Microfluidic Devices Using Super-Lens Manipulated by Optically-Induced Dielectrophoresis," Proceedings of the 16th International Conference on Nanotechnology, Sendai, Japan, Aug. 22-25, 2016, pp. 412-414.

Li, J., et al., "Optical Nanoscopy Using Swimming Spherical Lens," Paper No. ITh1E.1, Imaging Systems and Applications, San Francisco, Jun. 26-29, 2017.

Ling, J., et al., "Modelling and Verification of White Light Oil Immersion Microsphere Optical Nanoscope," Optical and Quantum Electronics 49(377):1-11, Nov. 2017.

Michihata, M., et al., "Fundamental Validation for Surface Texture Imaging Using a Microsphere as a Laser-Trapping-Based Microprobe," Advanced Optical Technologies, 3(4):417-423, Aug. 2014.

Stanescu, S., et al., "Optical Scanning Nanoscope with Microsphere Attached Objective Lens for Super Resolution 3D Virtual Imaging," Paper No. BoTu3A.5, Bio-Optics: Design and Application, Optical Society of America, San Diego, Apr. 2-5, 2017.

Tantussi, F., et al. "Microsphere Embedded in Cantilever Opens the Afm to High Resolution Optical Microscopy," the European Conference on Lasers and Electro-Optics, Optical Society of America, Jun. 25, 2017.

Wang, F., et al. "Scanning Superlens Microscopy for Non-Invasive Large Field-of-View Visible Light Nanoscale Imaging," Nature Communications 7(13748):1-10, Dec. 2016.

\* cited by examiner

OPTICAL IMAGING EQUIPMENT AND METHOD

CROSS-REFERENCE TO RELATED APPLICATION

This application claims the benefit of Chinese Patent Application No. 201811633685.8, filed on Dec. 29, 2018, and entitled "OPTICAL IMAGING EQUIPMENT AND METHOD," in the National Intellectual Property Administration of China, the whole disclosure of which is incorporated herein by reference.

TECHNICAL FIELD

The invention is related to an optical imaging equipment and method, in particular, to a label-free, wide-field, far-field, super-resolution optical imaging equipment and method, its resolution exceeds the optical diffraction limit.

BACKGROUND

An optical microscope is one of the most important scientific achievements in human history, which is of epoch-making significance to the development of life science and has greatly promoted the development of related scientific fields. It has become an indispensable and important tool for modern scientific research. However, conventional optical microscope's resolution is limited by the optical diffraction limit (~ 200 nm) and is unable to distinguish the fine structures inside a sample, such as a cell. Therefore, optical imaging whose resolution exceeds the optical diffraction limit (i.e., super resolution) has become an urgent problem to be solved in the field of life science, a high-density information storage, a ultra-high-density integrated chip detection, a high-resolution lithography and other related optical fields. Although various electronic microscopes and scanning probe microscopies, for example, Near Field Scanning Optical Microscopy (NSOM), Atomic Force Microscopy (AFM) possess nanometer resolution, but they have certain restrictions on the sample, especially, they are not suitable for the observation of life samples in a liquid environment. At present, the optical microscope is still the most powerful research tool in life science.

In recent years the development of fluorescence super-resolution microscopy has revolutionized the bio-optical imaging technology and its inventors won the Nobel Prize in 2014, which shows the significance of super-resolution optical imaging technology. However, the above fluorescence super-resolution microscopy still has some limitations and deficiencies. For example, all of the fluorescence super-resolution microscopes require the sample to be labeled with a specific fluorophore in advance and excited by a light source of a specific wavelength. Moreover, the fluorescence labeling can interfere with the sample, and some samples cannot be labeled by the fluorophore. In addition, the images obtained from all of the fluorescence super-resolution microscopy mentioned above are reconstructed through mapping all fluorescent points, and are not optical images of real objects, and the imaging speed is limited. Therefore, the development of a breakthrough optical diffraction limit, label-free, far-field, wide field, super-resolution optical imaging technology is particularly important and becomes an urgent problem in the field of science and technology.

Figure 1:
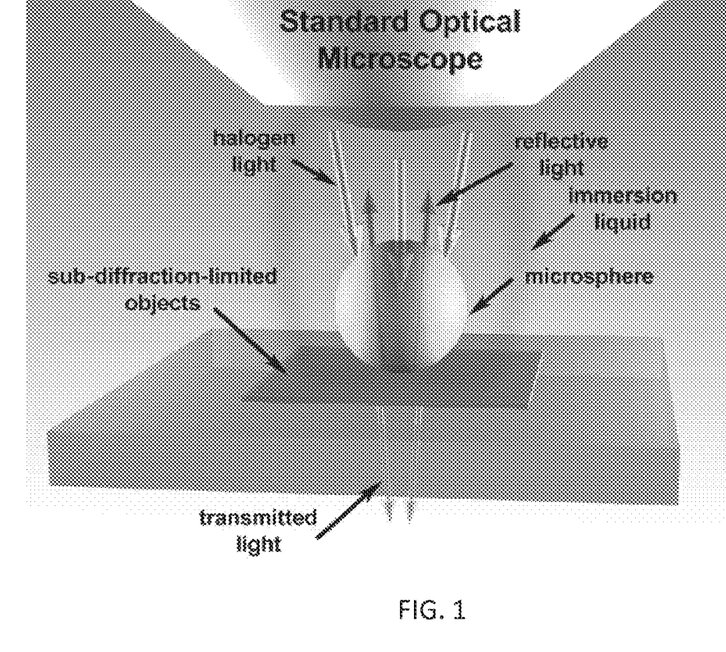
FIG. 1 is a schematic diagram of microsphere imaging.

New research shows that a micron-sized sphere of transparent media, or "microspheres", placed on a surface of a sample has a "photonic nanojet effect" that is, it can transfer the evanescence wave of sample surface, which carrying fine structure information of the sample onto the distance, and the evanescence wave can be received by the optical objective lens placed in far field, which means the distance between the sample and the objective lens is much larger than the wavelength of light, so as to achieve far-field super-resolution optical imaging that breaks through the optical diffraction limit, and its principle is shown in FIG. 1. Existing experiments have demonstrated that the resolution of imaging using microspheres can be less than 100 nm. However, in the existing research the microsphere is generally formed by in situ self-assembly or preparation beforehand, the microsphere are "randomly" settled on the surface of the sample and cannot be precisely located in any region of interest (ROI) of the sample. Moreover, a coverage area of the microsphere (several microns to tens of microns) is very small, and the observable field of view (FOV) is very limited, so the whole sample cannot be observed. In addition, the longitudinal distance between the microsphere and the sample cannot be controlled, so it is difficult to achieve the best imaging effect. At present, the super-resolution imaging technology can only be used as a principle demonstration, but not practical application. It can be seen that in order to achieve practical application, the microsphere must be effectively manipulated so that it can locate any ROI of the sample and move relative to the sample.

At present, there are a few ways of manipulating the microsphere, they mainly include (1) AFM tips, (2) capillary, (3) PDMS microsphere array thin films, (4) micro-flow pools, (5) magnetic guidance and other methods. Specifically, for the first two manipulation methods the tip of the micro-cantilever or capillary directly rigid connect the microsphere, and the microsphere contacts with the sample, so it is easy to cause damage of the sample or the microsphere and break the tip during moving. In addition, due to the small working distance of the high-power microscope objective, it is very difficult to add a microcontroller between the sample and the microscope objective and move it in three dimensions (3D) scanning, and the stability and repeatability of the system are difficult to guarantee. In other words, it is difficult to combine microsphere manipulation with microscopic imaging. The third method of manipulating the microsphere is that the microspheres are made into an array embedded PDMS thin membrane, which be used like the cover glass, and imaging with multiple microspheres simultaneously. It is equivalent to expand the interested area of imaging, but this method inevitably exists Mosaic effect in the image. Also, the film thickness, which has been determined in advance, cannot be adjusted (focusing) in real-time according to the actual situation for different samples. The fourth manipulation method is to make the microsphere moving in the microflow device by means of the microflow environment through the light-induced two-dimensional electrophoresis. Although the super-resolution imaging for a large area is realized, this method must rely on microfluidic environment, and the manipulation is complex and its application range is greatly limited. The fifth manipulation method called "swimming microrobot optical nanoscopy" (SMON) is to package microsphere using magnetic material and drive the magnetic microsphere moving on the sample surface by means of local catalytic chemical reaction and magnetic guide, thus perform super-resolution scanning imaging for a large area. Although the large-area super-resolution images were successfully got by this method, however, the preparation and manipulation of microsphere is complicated, and chemical fuels must be included in the samples, so their practical application is greatly limited.

Therefore, there is still a lack of a simple, universal and effective method to manipulate the microsphere.

SUMMARY

One purpose of the present invention is to provide an optical imaging equipment and a method that can solve one or more defects in the existing technology such as the problem that the microsphere cannot be manipulated. Meantime, a universal, simple and convenient microsphere manipulate method is presented.

Another purpose of the present invention is to provide an optical imaging equipment and method that can solve the existing technology problem that it is impossible to image any ROI on the sample and individual microsphere's FOV is too small to image whole sample. Here, the invention presents an optical imaging method and an equipment fabricating scheme that can realize a large FOV, wide field, label-free imaging with the feature of simple, convenient, fast and resolution excessing optical diffraction limit (super resolution) based on the ordinary optical microscopy.

To achieve the above purposes the present invention provides an optical imaging equipment, its features include:

An optical microscope comprising an objective table, an objective lens and a light source module, wherein the objective table is capable of moving in the XY-plane (that is, a plane formed by the X axis and the Y axis), the light source module contains a lighting light source for optical imaging, the objective lens can move along the Z-axis direction which is perpendicular to the XY-plane;

A 3D electric sample table, fixed on the objective table for carrying a sample to be texted and driving the sample to move in 3D direction relative to the objective table; and a microsphere, fixed on the transparent substrate, wherein the optical lens, the microsphere, and the sample are arranged along the Z-axis direction in sequence;

wherein, the transparent substrate along with the microsphere thereon can be moved to a first position and remain stationary with respect to the objective table in the Z-axis direction; the 3D electric sample table can adjust the sample with respect to the microsphere to an imaging plane which is parallel to the XY-plane and a first image is formed by the microsphere; the objective lens can be adjusted to a second position, so that the objective lens can perform a secondary imaging to the first image to form a second image.

In one or more embodiments of the invention, the objective lens, the microsphere and the sample to be tested are arranged from top to bottom along the Z-axis direction; the optical imaging equipment further comprises:

an electronic control unit, connected to the 3D electric sample table, which is configured to control a 3D movement of the 3D electric sample table, so that the sample to be tested is close to the microsphere and laterally translated relative to the microsphere according to a predetermined trajectory in the imaging plane in sequence so as to make the microsphere perform a scan for multiple regions of the sample to be tested; and an image recording unit, installed on the optical microscope, which is configured to collect the images corresponding to multiple regions of the sample to be tested.

In one or more embodiments of the invention, the optical imaging equipment further comprises a computer, connected with the electronic control unit and the image recording unit, which is configured to provide an operation interface, control the electronic control unit so as to synchronize the 3D electric sample table with the image recording unit, storage and display images, as well as seamlessly stitch the images of the multiple region images together to form an overall image of the sample to be tested.

In one or more embodiments of the invention, the 3D electric sample table comprises a fixed base and a moving base, the fixed base being fixed on the objective table; the fixed base has an installation groove which has a first through-hole in its bottom; the moving base is mounted in the installation groove and movable in the 3D directions; the moving base has a second through-hole corresponding to the first through-hole.

In one or more embodiments of the invention, the 3D electric sample table further comprises an adapter which has a third through-hole corresponding to the second through-hole, and the sample to be tested is placed on the top surface of the adapter.

In one or more embodiments of the invention, the transparent substrate is directly mounted on the top surface of the fixed base; and there is one/or more microsphere which is fixed on the lower surface of the transparent substrate and mounted downward; and/or the light source comprises a transmitted white light source and/or a reflected fluorescence excitation light source, wherein incident light emitted by the fluorescence excitation light source is incident to the sample after being divided by a semi-transparent and semi-reflective mirror; and/or the second image formed by reflection or transmission imaging; and/or the microsphere is a transparent medium sphere with a high refractive index which is greater than or equal to 1.5 and has a diameter of 10~100 microns; and/or the aperture of the objective lens is greater than or equal to 0.6, and the magnification ratio thereof is 40~100 times; and/or the sample to be tested is an unmarked sample; and/or when the sample is in the imaging plane the distance between the sample and the microsphere in the imaging plane is less than or equal to 100 nm.

In order to achieve above purposes, the invention further provides an optical imaging method, which is featured by:

providing the optical imaging equipment as described above;

moving the transparent substrate together with the microsphere thereon to the first position and immobilizing it relative to the objective table in the Z-axis direction.

adjusting the sample with respect to the microsphere to an imaging plane which parallel to the XY-plane by the 3D electric sample table, and forming the first image by the microsphere; and adjusting the objective lens to the second position, so that the objective lens perform the secondary image of the first image to form the second image.

In one or more embodiments of the invention, the optical imaging method described above further comprising:

controlling the 3D movement of the 3D electric sample table by an electronic control unit, so that the sample to be tested is close to the microsphere and laterally translated according to the predetermined trajectory in the imaging plane in sequence, and the microsphere perform a scan and imaging to multiple regions of the sample to be tested in sequence; and collecting images corresponding to the multiple regions to be tested by an image recording unit.

In one or more embodiments of the invention, the optical imaging method described above further comprising:

seamlessly stitching the images of the multiple regions together by a computer to form an overall image of the sample to be tested.

In one or more embodiments of the invention, a rectangular region which is about a half of a center of the FOV of the microsphere is taken as the FOV of imaging for seamless stitching.

The optical imaging equipment of the present invention can be achieved by modifying an ordinary fluorescence optical microscope. During the imaging process the microsphere is immobilized, and the sample is moved relative to the microsphere by the 3D electric sample table, so that the invention provides a simple, practical and convenient method of manipulating the microsphere. The equipment of the invention has the feature of simple structure, low cost, and fast imaging and is easy to operate. The optical imaging equipment of the present invention not only has a resolution exceeding the optical diffraction limit, but also does not need to make any mark on the sample, so that it does not interfere with the sample, and can observe the sample in situ without damage, it is especially suitable for the observation of fine structure of living biological specimens in the liquid physiological environment. Furthermore, it can work in transmission or reflection mode, and is suitable for any transparent or opaque sample imaging.

In the present invention the microsphere can also be accurately positioned at any position on the sample surface. Through moving the sample with respect to the microsphere using a 3D electric sample table the optical imaging equipment can further scan and image any ROI of a large sample, and the obtained image is a real wide-field optical image which is accustomed and easy to be accepted by people, rather than a point reconstructed image by mapping.

The above description will be illustrated in detail in embodiments, and further explanation of the technical scheme of the invention as following.

BRIEF DESCRIPTION OF THE DRAWINGS

In order to make the above and other purposes, features, advantages and embodiments of the invention more obvious and understandable, the attached diagram is illustrated as follows.

DETAILED DESCRIPTION OF THE EMBODIMENTS

In order to make the account of the present invention is more detailed and complete, the attached drawings and various embodiments described below may be referred to, the same numbers in the drawings represent the same or similar components. In another aspect, well-known components and steps are not described in the embodiments to avoid unnecessary restrictions on the invention. In addition, in order to simplify the drawings, some known and conventional structures and elements will be illustrated in the drawings in a simple and schematic manner.

Figure 2:
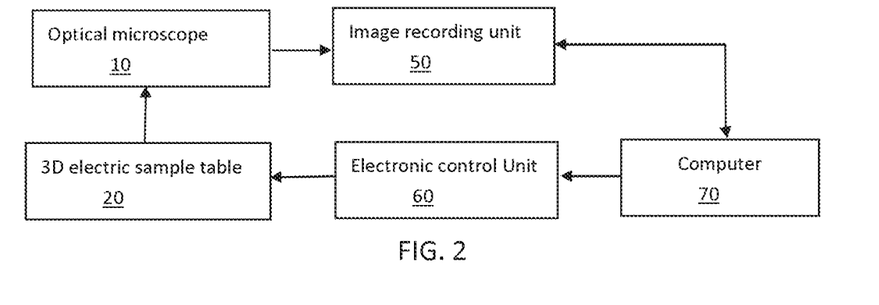
FIG. 2 is a block diagram showing a structure of an optical imaging equipment according to a preferred embodiment of the invention.

As shown in FIG. 2, an optical imaging equipment of a preferred embodiment of the invention includes an optical microscope 10, a 3D electric sample table 20, a sample to be tested 30, a microsphere 40, an image recording unit 50, an electronic control unit 60 and a computer 70, etc.

Figure 3:
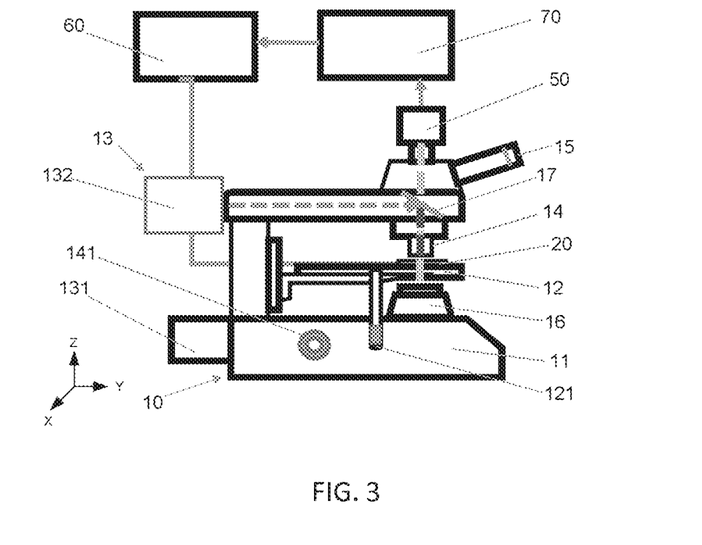
FIG. 3 is a structural diagram of an optical imaging equipment according to a preferred embodiment of the invention.

Referring to FIG. 3, the optical imaging equipment of the invention can be achieved by modifying a fluorescent optical microscope. The optical microscope 10 can be an ordinary upright fluorescent optical microscope, for example, it comprises a body 11, an objective table 12, a light source module 13 (131, 132), an objective lens 14, an eyepiece 15, a condenser 16, etc. Wherein, the objective table 12 is movable in an XY-plane, for example, it can be adjusted by adjusting lever 121. The objective lens 14 is located above the objective table 12 and is capable of moving in a Z-axis direction perpendicular to the XY-plane to achieve focusing and imaging of the sample to be test. For example, manual focusing can be achieved through a manual focusing knob 141, or a Z-motor can be used to control the movement and autofocus of the objective lens. The objective lens 14 can be a normal high-power long working distance objective lens. The aperture of the objective lens 14 can be 0.7~1.4 and the magnification ratio thereof can be 40~100 times. For example, an objective lens of 40×/0.8 can be used, and an objective lens of 60×/0.95 is preferred. The eyepiece 15 can be used to observe a formed image. The light source module contains a light source providing illumination light for optical imaging, which may include a white light source 131 and/or a fluorescent excitation light source 132. The white light source 131, for example, can be a halogen lamp or an LED lamp, which can be arranged on a side of the body 11, and the light emitted by it can be converged by the condenser 16, and penetrate the transparent sample to be tested, then transmit to the objective 14, thereby achieving transmission imaging. The fluorescent excitation light source 132, for example, can be a fluorescent excitation mercury lamp, which can be arranged on the side of the body 11, and the light generated by it can be incident to an opaque sample after divided by a semi-transparent and semi-reflective mirror 17, and then reflected by the sample, so as to achieve a reflection imaging. In other embodiments of the invention, of course, appropriate filters and attenuation plates may also be placed on the optical path to realize a better transmission or reflection imaging, which are not considered as limitations to the invention.

Figure 4A:
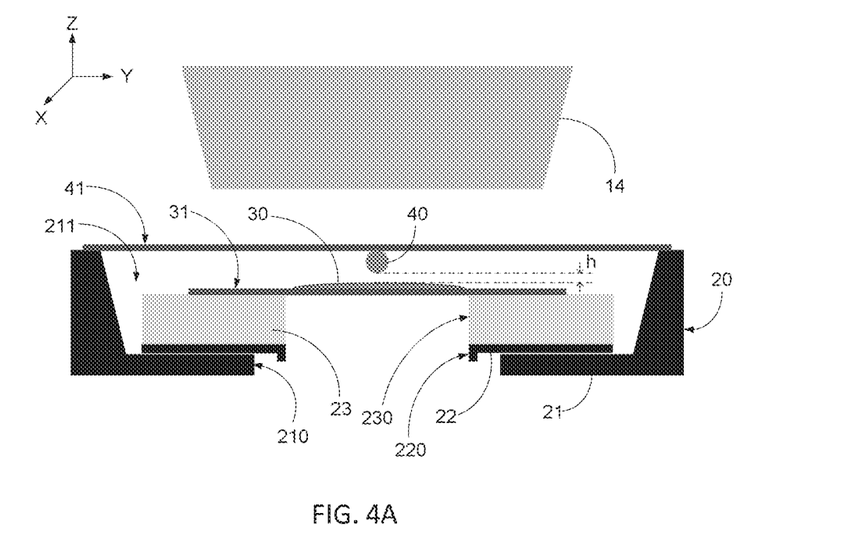
FIG. 4A is a schematic structural diagram of the 3D electric sample table of the invention, wherein a sample is placed on a moving base of the 3D electric sample table through an adapter.

Referring to FIG. 4A, in the invention, the 3D electric sample table 20 is fixed on the objective table 12 and configured to carry a sample 30, and drive the samples 30 to move with respect to the objective table 12 in three dimensions, such as along the X, Y, or Z-axes, so that accurately control of movement of the sample may be achieved. For example, it may be a nano-precision 3D piezoelectric ceramic transducer (PZT) table or a high precision stepper motor sample table. The 3D electric sample table 20 can also be manually adjusted horizontally along with the objective table 12 through the adjustment lever 121, to achieve a large range of sample movement.

Preferably, the 3D electric sample table 20 includes a fixed base 21 and a moving base 22, the fixed base 21 is fixed on the objective table 12. The fixed base 21 is provided with an installation groove 211, and a bottom of the installation groove 211 has a first through-hole 210. The moving base 22 is installed in the installation groove 211 and can move in 3D directions. The moving base 22 has a second through-hole 220 corresponding to the first through-hole 210. Further preferably, the 3D electric sample table 20 may further include an adapter 23, which is a hollow ring with the third through-hole 230 corresponding to the second hole 220. In this embodiment, the 3D electric sample table 20 adopts a commercialized PZT table with nano-precision, a speed and trajectory thereof can be controlled by a computer 70 software, and it is generally set to scan according to a zig-zag mode.

In this embodiment, the microsphere 40 can be one and fixed on a transparent substrate 41, for example, may be fixed by viscose. The microsphere 40 can be a BaTiCO$_3$ transparent microsphere, a refractive index thereof may be, for example, 1.9~2.1 and a diameter thereof may be, for example, 10~30 microns. Moreover, the objective lens 14, the microsphere 40, and the sample 30 are arranged from top to bottom along the Z-axis. It should be understood, of course, that in other embodiments, when the optical microscope 10 apply an inverted microscope, the objective lens, the microsphere, and the sample are arranged in a reverse order, that is, from the bottom to top along the Z-axis. Furthermore, in other embodiments, the number of the microsphere 40 is not limited to one, the fixed manner is not limited to bonding, and the material is not limited to BaTiCO$_3$, those are not limited to the present invention. In this embodiment, the microsphere 40 adopts a BaTiCO$_3$ transparent medium microsphere with a refractive index of 1.9 and a diameter of 23 microns.

The electronic control unit 60 is connected to the 3D electric sample table 20, which is used to control the 3D electric sample table 20 to translate the sample 30 horizontally in an imaging plane in sequence according to a predetermined trajectory, so that the microsphere 40 can scan and image multiple regions of the sample 30 in sequence. In this embodiment, the electronic control unit 60 provides the high-precision PZT table driving power and is responsible for communicating with the computer 70. In this embodiment, the electronic control unit 60 can provide a high stable driving power for the PZT table and an objective lens autofocus control module (such as Z-motor). Meanwhile, it can communicate with the computer 70 through a motion control card, thus realizing full automatic control of all optical components. Therein, the motion control card is a commercial product, such as NI 7344, which has multiple analog input/output (I/O), digital input/output (I/O), and clock.

The image recording unit 50 is mounted on the optical microscope and is used for image acquisition, including but not limited to simultaneous acquisition of multiple images corresponding to the multiple regions under test. In this embodiment, the image recording unit 50 can adopt a high-resolution digital CCD camera whose exposure time and imaging FOV can be controlled by a software of computer 70 to realize real-time image acquisition. In addition, image acquisition and sample movement can be carried out alternately to realize a partition image acquisition of samples.

The computer 70 is connected to the electronic control unit 60 and the image records units 50, and used to provide an operating interface such as parameter settings, etc., control the synchronization of 3D electric sample table and the image recording unit 50, storage and display images, as well as seamlessly stitch the images of the multiple regions together to form an overall image of the sample 30. In this embodiment, the computer 70 is equipped with an application software to realize the control of various hardware devices (including but not limited to PZT table and CCD camera), and the storage, stitching and display of images collected by the CCD camera. Specifically, the application software can be developed with LabVIEW and has the following basic functions: (1) providing a parameter setting window for PZT table control and CCD camera image acquisition, and a real-time image display window; (2) controlling the synchronization of the PZT table and CCD camera, and controlling PZT for an automatic focus through an image recognition of the CCD camera and feedback for the images collected by CCD camera; (3) storing, stitching and displaying images.

Figure 4B:
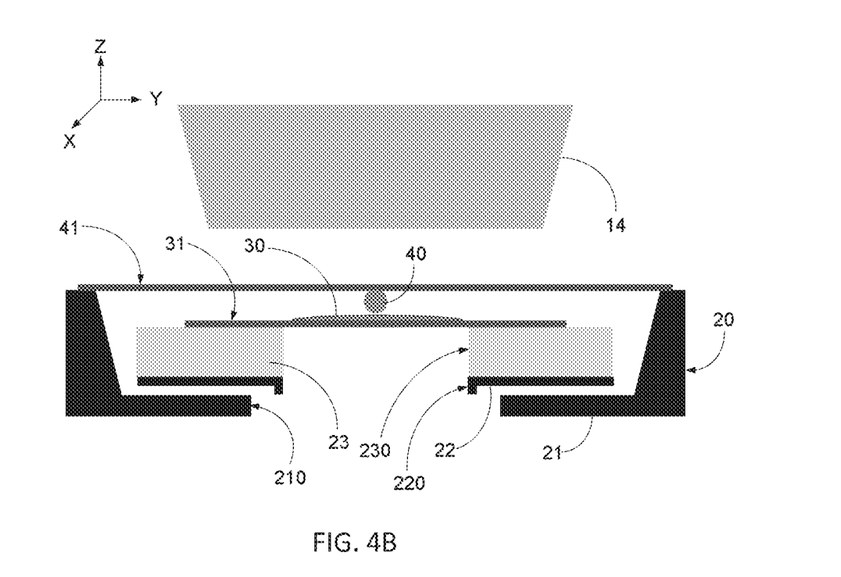
FIG. 4B shows a status diagram of the 3D electric sample table in FIG. 4A, which drives the sample to move into an imaging plane to realize optical imaging.

In the present invention the sample 30 can be placed on the top surface of the adapter 23 by means of a slide 31, as shown in FIG. 4A. The transparent substrate 41 can be directly mounted on the top surface of the fixed base 21 of the 3D electric sample table 20, and the number of the microsphere 40 can be one and the microsphere 40 is glued to the lower surface of the transparent substrate 41 and mounted downward. Wherein the transparent substrate 41 together with the microsphere 40 thereon can be moved to a first position, such as a position directly below objective lens 14 as shown in FIG. 4A, and remain stationary with respect to the objective table 12 in the direction of the Z-axis (as shown in FIG. 3). The 3D electric sample table 20 can drive the sample 30 with respect to the microspheres 40 to an imaging plane which is parallel to a XY-plane, and a first image is formed by the microsphere. For example, the sample 30 can be lifted up a distance h from the position as shown in FIG. 4A to the position of imaging as shown in FIG. 4B. Preferably, a distance between the sample 30 in the imaging plane and the microsphere is equal or less than 100 nm. The objective lens 14 can be adjusted to a second position, so that the objective lens 14 can perform a secondary imaging to the first image, that is, form a second image. FIGS. 4A and 4B only show the movement of the sample in the Z-axis direction, but it is understood that the sample can be moved in the three-dimensional directions by the 3D electric sample table 20, which is not repeated here.

Figure 5:
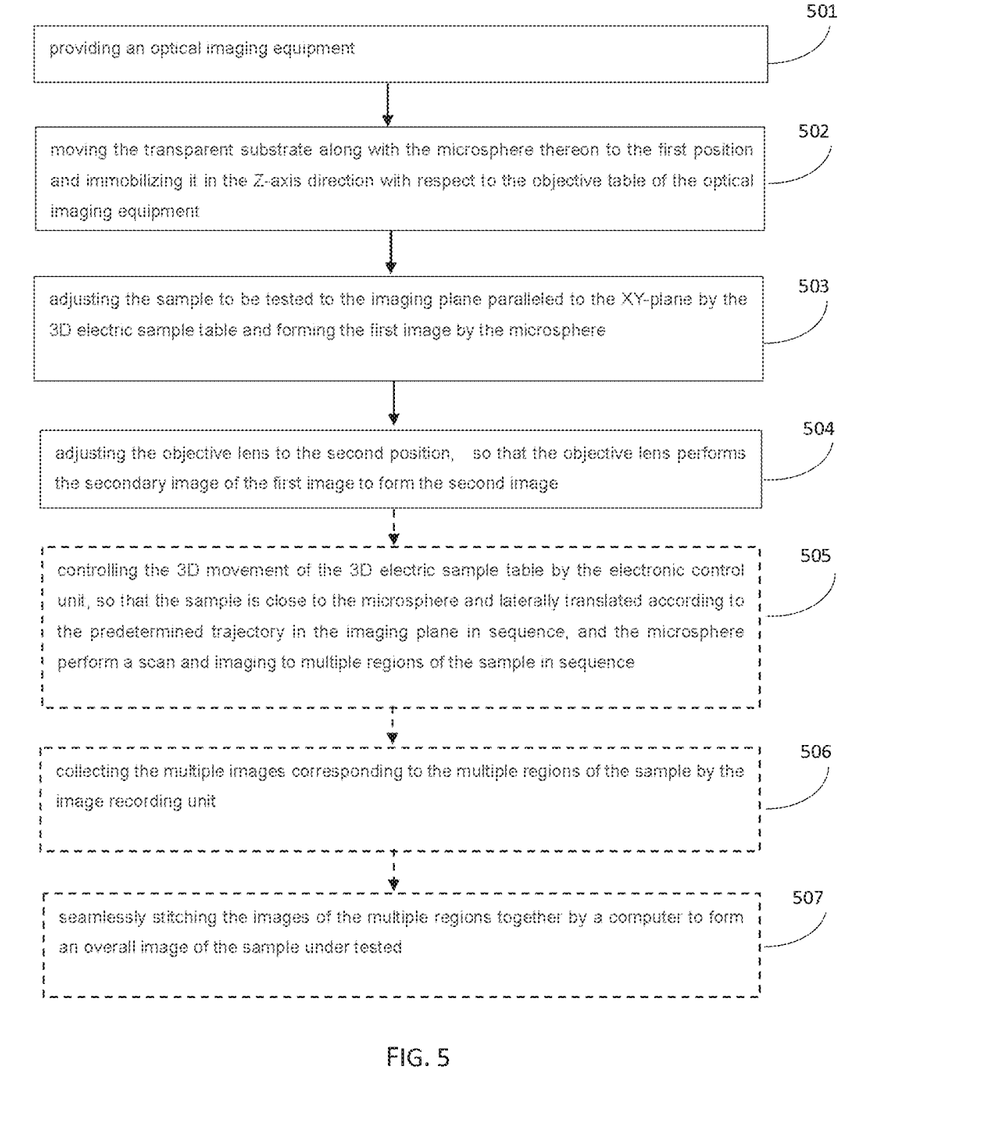
FIG. 5 is a flowchart of an optical imaging method of the invention.

Correspondingly, the present invention provides an optical imaging method, as shown in FIG. 5, for example, it might include:

501. providing an optical imaging equipment;

502. moving the transparent substrate along with the microsphere thereon to the first position and immobilizing it in the Z-axis direction with respect to the objective table of the optical imaging equipment;

503. adjusting the sample to be tested to the imaging plane paralleled to the XY-plane by the 3D electric sample table and forming the first image by the microsphere; and 504. adjusting the objective lens to the second position, so that the objective lens performs the secondary image of the first image to form the second image.

In one or more embodiments of the present invention, the optical imaging method can further include:

505. controlling the 3D movement of the 3D electric sample table by the electronic control unit, so that the sample is close to the microsphere and laterally translated according to the predetermined trajectory in the imaging plane in sequence, and the microsphere perform a scan and imaging to multiple regions of the sample in sequence; and 506. collecting the multiple images corresponding to the multiple regions of the sample by the image recording unit.

In one or more embodiments of the present invention, the optical imaging method can further include:

507. seamlessly stitching the images of the multiple regions together by a computer to form an overall image of the sample under tested.

Referring to FIG. 3~ FIG. 4B, the operating steps of the optical imaging equipment of the invention are described in detail as following, which mainly includes:

Step 1: bonding the transparent medium microsphere with a high refractive index (n=1.9~2.1) and a diameter of 10~30 microns on a center of the transparent substrate with a thickness about 0.15 mm.

Step 2: placing the sample to be tested, such as cell and blue-ray disc, on the standard slide which is fixed on the adapter in advance. Wherein, the adapter is placed on the center of the hollow 3D electric sample table, that is, on the moving base, the height of the adapter after loading the sample is slightly lower than the upper surface of the fixed base of the 3D electric sample table, and the 3D electric sample table is fixed on the objective table of the optical microscope.

Step 3: adjusting the manual handle of the objective table and moving the sample to the center of the field of view under the objective lens of the optical microscope.

Step 4: placing the transparent substrate with the microsphere facing down on the upper surface of the fixed base of the 3D electric sample table, and adjusting the transparent substrate so that the microsphere is directly under the objective lens and is fixed with respect to the objective table and the fixed base of the 3D electric sample table in the Z-axis direction.

Step 5: manually operating the adjusting lever of the objective table and the manual focusing knob to make the microsphere in the center of the field of view until the microsphere can be clearly seen in the eyepiece or the screen of the CCD camera.

Step 6: moving the 3D electric sample table in the XY-plane until the ROI of the sample directly below the microsphere and in the center of the FOV of the microsphere.

Step 7: adjusting the 3D electric sample table in the Z-axis direction to make the sample gradually close to the microsphere until the distance between the microsphere and the sample is no more than 100 nm, but no contact each other. At this time, the sample S is imaged by the microsphere to form a virtual image S' located below the sample.

Step 8: fine adjusting the manual focusing knob of the objective lens to make the objective lens perform secondary imaging to the virtual image S', which acts as a virtual object of the objective lens, until a clear real image S" of the sample is observed on the eyepiece or the screen of the CCD camera.

Step 9: recording the real image S" imaged by the objective lens by the high-resolution CCD camera mounted on the optical microscope. Before image acquisition an appropriate rectangular region in the center of the microsphere's field of view, which is less than the diameter of the microsphere, is set as the FOV of the image acquisition by the CCD camera.

Step 10: accurately moving the 3D electric sample table according to the zig-zag path through an application software, so that the microsphere can perform a scan and imaging to the multiple ROI on the surface of the sample one by one.

Step 11: if necessary, performing an automatic focus through the optical feedback system during scanning and imaging to image each micro-region clearly.

Step 12: in the scanning process recording the images corresponding to each micro-region by the CCD camera synchronously and in real time, and storing it in the computer.

Step 13: seamlessly stitching the images of each micro-region with computer software to finally form a super-resolution image of a large field of view. In order to eliminate the pillow distortion caused by the microsphere imaging, only about ½ region in the center of the FOV of the microsphere is taken as the FOV of the each regional image in the stitching process. Accordingly, the moving step size of the 3D electric sample table is reduced by a half during collecting the image.

The optical imaging equipment of the present invention provides a simple and convenient microspheres manipulation method, which solves the problem of the microspheres accurate location at any position of the sample surface. In addition, through moving the samples with respect to the microsphere, the scanning and imaging to any ROIs of a large sample are realized, thereby solving an existing key technical problem that the microsphere is too small to image a large sample.

The invention further proposes a new optical microscopic imaging scheme of three lenses (microsphere+objective lens+eyepiece), which incorporates near field and far field optics, so as to establishes a practical, label-free, wide-field and fast super-resolution optical microscope. Specifically, the super-resolution optical imaging system can be composed of three optical elements: a microsphere, an objective lens and an image recording unit (generally a CCD camera), and the objective lens, microsphere and sample to be tested are arranged from top to bottom to form a "sandwich" structure. Wherein the microsphere is fixed on the bottom surface of the transparent substrate and is immobile with respect to the body of the optical microscope, such as the objective table. The sample is placed on the 3D electric sample table, which is fixed on the objective table. The 3D movement of the sample with respect to the microsphere can be realized by the movement of the 3D electric sample table. The objective lens is above the microsphere and can be freely moved along the longitudinal (Z-axis) direction for focusing. The optical imaging equipment of the invention is suitable for any transparent or opaque sample, that is, it can not only perform a transmission imaging for transparent objects such as cells, but also perform a reflect imaging for opaque objects. The optical imaging equipment of the invention can realize an optical imaging without marking the sample to be tested.

Figure 6A:
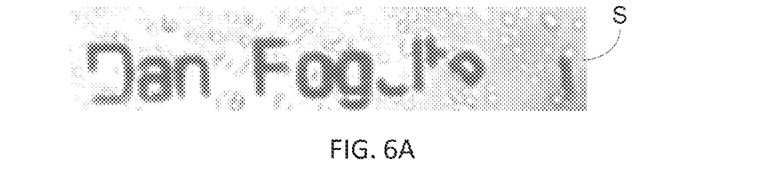
FIG. 6A is a schematic diagram of a sample to be tested (lithographic micron English letters)

The unmarked super-resolution optical imaging equipment of the invention has a spatial resolution of $\lambda/7$ and a lateral magnification of 5.4 times, breaking through the traditional optical diffraction limit and achieving label-free optical super-resolution microscopic imaging. The invention successfully realized the microsphere's (n=1.9) movement with respect to the sample which is composed of English letters in micron size made by lithography. As shown in FIG.

Figure 6B:
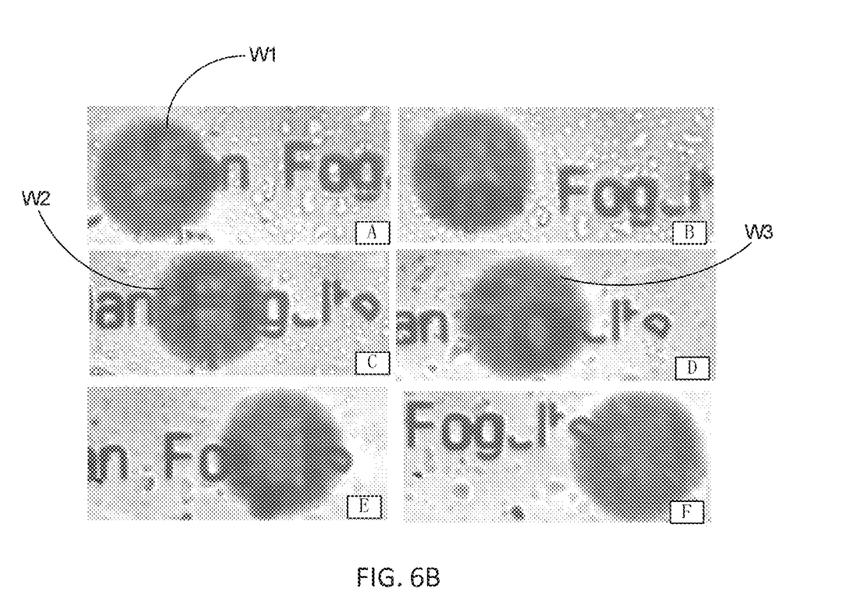
FIG. 6B is a schematic diagram of imaging effect that an optical imaging equipment of the invention is used to realize the movement of the sample relative to the microsphere, wherein the sample in FIG. 6A is moved from right to left (A→F)
Figure 7A:
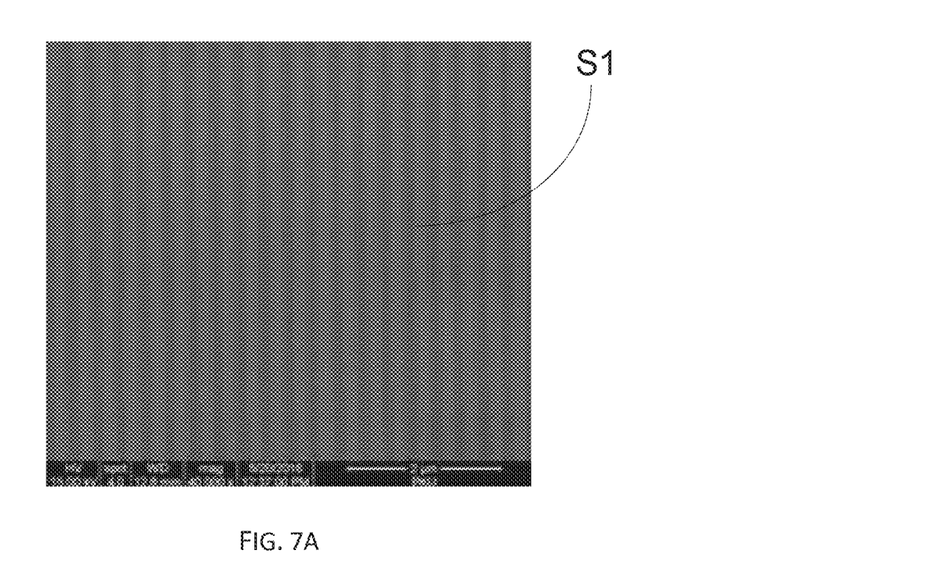
FIG. 7A shows an image of stripes on a blue disc obtained by an electronic microscope, the stripes having a stripe period of 300 nm and a stripe interval of 130 nm.
Figure 7B:
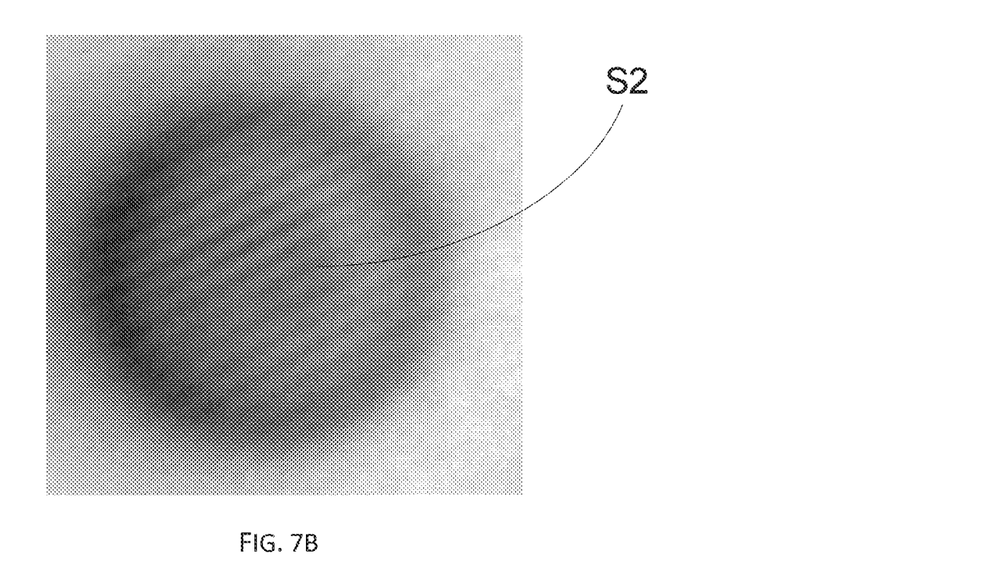
FIG. 7B shows an image of the same stripes on the blue disc obtained by a microsphere imaging method in which a barium titanate microsphere (d=23 microns) is immersed in water and on a surface of the blue disc.

6A, the sample S has the lithography letter "Dan Fog". When moving the sample S from right to left in FIG. 6A, corresponding imaging effects are shown in FIG. 6B from A to F. The clear letters, such as enlarged "D" (shown as "W1" in position A in FIG. 6B), "F" (shown as "W2" in position C in FIG. 6B), and "O" (shown as "W3" in position D in FIG. 6B) can be observed under the microsphere during the movement of the sample S. To confirm the optical imaging equipment of the present invention can realize super-resolution imaging, a barium titanate microspheres (d=23 microns) immersed in water is applied to perform a reflective imaging to a blue-ray disc, wherein stripes of the disc has a period of 300 nm and an interval of 130 nm. For example, FIG. 7A shows stripes S1 obtained by an electronic microscopy imaging method, while FIG. 7B shows stripes S2 obtained by the microsphere imaging method of present invention. Contrasting FIG. 7A to 7B, it can be seen that a super-resolution imaging is really realized by the present invention.

The super-resolution optical imaging of the invention is fundamentally different from the existing Near Scanning Optical Microscope (NSOM) in imaging mode and nature. The former belongs to a "wide field" direct optical imaging, while the latter is a "point scan" reconstructed image (mapping). Also, the label-free super-resolution optical imaging of the present invention has a substantial difference from fluorescence super-resolution imaging in the prior art. The former does not need any label, and belongs to the white light illumination wide field optical imaging, while the latter must be labeled by fluorescent prior to imaging, use a special wavelength excitation light illumination, and need reconstruction to obtain the image (mapping).

"The label-free super-resolution optical microscopic imaging" of the present invention is the development and supplement to "the fluorescent super-resolution optical microscopic imaging", it will play an important economic and social benefit in the fields of life science and micro-nano materials etc.

In summary, "the label-free wide-field super-resolution optical microscope" of the present invention will play a unique and important role on a sample detection in the fields of life science, hospital inspection, nanotechnology, micro-nano electronics, etc. It has the following advantages: (1) super-resolution: the resolution exceeds the optical diffraction limit, (2) label-free: the sample does not need any marking and not is interfered. The samples can be observed in situ without damage, especially it is suitable for the observation of fine structure of living biological specimens in the liquid physiological environment. (3) wide-field imaging: the acquired image is a direct optical wide-field image (imaging) that is accustomed by people, rather than a point-scanning reconstruction picture (mapping), (4) fast imaging: it is easy to operate and the imaging is rapid, (5) the structure is simple and the cost is low.

Although the invention has been illustrated by several preferred embodiments as above, it is not intended to limit the present invention. Any person with ordinary knowledge in the relevant technical field can make any modifications and changes without departing from the spirit and scope of the present invention, so the protection scope of the present invention is defined by the attached claims.

What is claimed is:

1. An optical imaging equipment, comprising:
    an optical microscope, comprising an objective table, an objective lens and a light source module, wherein the objective table is movable in a XY-plane, the light source module comprises a light source for providing illumination light for optical imaging, the objective lens is movable in a Z-axis direction which is perpendicular to the XY-plane;
    a 3D electric sample table, fixed on the objective table for carrying a sample to be tested and driving the sample to be tested to move in 3D directions relative to the objective table; and
    a microsphere, fixed on a transparent substrate, wherein the objective lens, the microsphere, and the sample to be tested are arranged along the Z-axis direction in sequence;
    wherein, the transparent substrate along with the microsphere thereon can be moved to a first position and remain stationary with respect to the objective table in the Z-axis direction; the 3D electric sample table can adjust the sample to be tested with respect to the microsphere to an imaging plane which is parallel to the XY-plane and a first image is formed by the microsphere; the objective lens can be adjusted to a second position, so that the objective lens can perform a secondary imaging to the first image to form a second image.

2. The optical imaging equipment according to claim 1, wherein the objective lens, the microsphere and the sample to be tested are sequentially arranged from top to bottom in the Z-axis direction; the optical imaging equipment further comprises:
    an electronic control unit, connected to the 3D electric sample table, which is configured to control a 3D movement of the 3D electric sample table, so that the sample to be tested is close to the microsphere and laterally translated with respect to the microsphere according to a predetermined trajectory in the imaging plane in sequence so as to make the microsphere perform a scan and imaging to multiple regions to be tested of the sample to be tested; and
    an image recording unit, installed on the optical microscope, which is configured to collect images corresponding to the multiple regions of the sample to be tested.

3. The optical imaging equipment according to claim 2, further comprising:
    a computer, connected with the electronic control unit and the image recording unit, which is configured to provide an operating interface, control the electronic control unit so as to synchronize the 3D electric sample table with the image recording unit, storage and display images, as well as seamlessly stitch the images of the multiple regions together to form an overall image of the sample to be tested.

4. The optical imaging equipment according to claim 1, wherein, the 3D electric sample table comprises a fixed base and a moving base, the fixed base being fixed on the objective table; the fixed base has an installation groove which has a first through-hole in its bottom; the moving base is mounted in the installation groove and movable in the 3D directions; the moving base has a second through-hole corresponding to the first through-hole.

5. The optical imaging equipment according to claim 4, wherein the 3D electric sample table further comprises an adapter which has a third through-hole corresponding to the second through-hole, and the sample to be tested is placed on a top surface of the adapter.

6. The optical imaging equipment according to claim 1, wherein, the transparent substrate is directly mounted on a top surface of the fixed base, and there is one/or more microsphere which is fixed on a lower surface of the transparent substrate and mounted downward; and/or the light source comprises a transmitted white light source and/or a reflected fluorescence excitation light source, wherein incident light emitted by the fluorescence excitation light source is incident to the sample to be tested after being divided by a semi-transparent and semi-reflective mirror; and/or the second image is formed by reflection or transmission imaging; and/or the microsphere is a transparent medium sphere with a high refractive index which is greater than or equal to 1.5 and has a diameter of 10~100 microns; and/or the aperture of the objective lens is greater than or equal to 0.6, and the magnification ratio thereof is 40~100 times; and/or the sample to be tested is an unmarked sample; and/or when the sample to be tested is in the imaging plane, an distance between the sample to be tested and the microsphere is less than or equal to 100 nm.

7. An optical imaging method, comprising:

providing the optical imaging equipment according to claim 1;

moving the transparent substrate along with the microsphere thereon to the test position and immobilizing it in the Z-axis direction with respect to the objective table;

adjusting the sample to be tested with respect to the microsphere to the imaging plane which parallel to the XY-plane by the 3D electric sample table, and forming the first image by the microsphere; and adjusting the objective lens to the second position, so that the objective lens performs the secondary image of the first image to form the second image.

8. The optical imaging method according to claim 7, further comprising:

controlling the 3D movement of the 3D electric sample table by an electronic control unit, so that the sample to be tested is close to the microsphere and laterally translated according to the predetermined trajectory in the imaging plane in sequence, and the microsphere perform a scan and imaging to multiple regions to be tested of the sample to be tested in sequence; and collecting images corresponding to the multiple regions to be tested by an image recording unit.

9. The optical imaging method according to claim 8, further comprising:

seamlessly stitching the images of the multiple regions together by a computer to form an overall image of the sample to be tested.

10. The optical imaging method according to claim 9, wherein, when seamless stitching is performed, a rectangular region which is about a half of a center of the microsphere's field of view is taken as a field of view of imaging.

* * * * *